Fig 3

INVENTORS
FREDERICK N. STEPHENS
CARL C. PERKINS, JR.
BY
Henry L. Shevier
ATTORNEY Aug. 19, 1958         F. N. STEPHENS ET AL         2,848,175
                  LINEAR FEED MAT WINDING MACHINE
Filed May 17, 1954                               5 Sheets-Sheet 4

INVENTORS
FREDERICK N. STEPHENS
CARL C. PERKINS, JR.
BY
Harry L. Shavier
ATTORNEY Aug. 19, 1958     F. N. STEPHENS ET AL     2,848,175
LINEAR FEED MAT WINDING MACHINE
Filed May 17, 1954     5 Sheets-Sheet 5

INVENTORS
FREDERICK N. STEPHENS
CARL C. PERKINS, JR.
BY
ATTORNEY

United States Patent Office 2,848,175
Patented Aug. 19, 1958

2,848,175

LINEAR FEED MAT WINDING MACHINE

Frederick Norton Stephens, Prairie Village, and Carl C. Perkins, Jr., Mission, Kans., assignors to Gustin-Bacon Manufacturing Co., Kansas City, Mo., a corporation of Missouri Application May 17, 1954, Serial No. 430,012

23 Claims. (Cl. 242—55.1)

Our invention relates to a mat winding machine and more particularly, to a linear feed mat winding machine for automatically winding lengths of mat successively around a plurality of mandrels.

Winding machines of the prior art for winding a mat or bat of fibrous material around a mandrel to form a tube or duct of insulating material or the like employ either a plurality of rolls without a belt or a plurality of belts as the wrapping means. A mandrel upon which a tube is to be formed is placed on the machine and the mandrel must be manually replaced when a new tube is to be formed. When a number of tubes are to be formed, mandrels must manually be fed in succession to the machine. The manufacture of a tube of considerable length on a machine of the prior art requires the use of an extremely long mandrel. The length of such a mandrel may be so great that the mandrel deflects at its center or bows during the wrapping operation so that the resultant tube or duct is unsatisfactory. Consequently, to form a long tube, a number of separate sections must be formed with short mandrels in successive operations. This requires a more rapidly acting machine or a larger number of machines. The rate of production possible on machines of the prior art is limited, and accordingly, for a desired production, more machines of the prior art are necessary.

We have invented a linear feed mat winding machine on which tubes of insulating material may automatically and rapidly be formed successively on a plurality of individual mandrels. Our machine is completely automatic. The mandrels are supplied to the wrapping operation. The mat is fed to and wound upon the mandrel and the mandrel bearing the mat wound thereon in the form of a green tube is automatically removed from the wrapping machine and fed to the succeeding operation. Owing to the automatic nature of the machine, its operation can be unusually rapid. The construction of our machine is such that it may readily be formed with a number of sections, each employing its own mandrel feeding and wrapping means, so that a number of sections of tubing may simultaneously be formed on individual mandrels, employing a common drive means and control means.

One object of our invention is to provide a linear feed mat winding machine for automatically and rapidly forming a section of tube of insulating material or the like successively on each of a plurality of mandrels.

Another object of our invention is to provide a mat winding machine in which the successive operations from the supplying of mandrels to the machine to the removing of mandrels bearing the wrapped green tube from the machine are completely automatic.

A further object of our invention is to provide a mat winding machine on which a number of sections of tube may simultaneously be formed on individual mandrels.

Yet another object of our invention is to provide a mat winding machine with a completely automatic mandrel feed for supplying mandrels to the winding station of the machine.

Another object of our invention is to provide a mat winding machine which will automatically and successively position the empty mandrel, position wrapping means about the mandrel, feed the mat to be wound upon the mandrel, wrap the mat about the mandrel and then remove the mandrel with the mat wrapped around it in the green state from the machine.

Other and further objects of our invention will appear from the following description.

In general our invention contemplates the provision of a linear feed mat winding machine including a continuously driven endless belt carried by a plurality of rolls. Pairs of arms support respective ones of a pair of these rolls for movement toward and away from each other to an open and a closed position, respectively. We provide a conveyor for carrying a mandrel upon which a tube of insulating material or the like is to be formed to a position adjacent the portion of the belt extending between the rolls of said pair of movable rolls when the rolls occupy the open position. Automatic means then actuates the movable roll-carrying arms to their closed position to wrap the belt around the mandrel to form a pocket in which fibrous material is wrapped about the mandrel to form a tube or duct. When the tube has been formed, the control means operates to open the arms. As the arms approach the full open position, means is actuated to drive the mandrel conveyor one step to position a mandrel at the wrapping station and present a new mandrel to the now open belt. At the same time, a discharge conveyor removes from the mandrel conveyor at a removing station the mandrel about which the tube has been formed. As the mandrels reach their new positions, the control means again closes the movable belt-carrying arms, and the cycle is repeated. We provide means for feeding the mandrels from a supply of mandrels successively to a position where they may be engaged by the mandrel conveyor and conveyed to the winding station of the machine.

In the accompanying drawings which form part of the instant specification and which are to be read in conjunction therewith and in which like reference numerals are used to indicate like parts in the various views.

Figure 1:
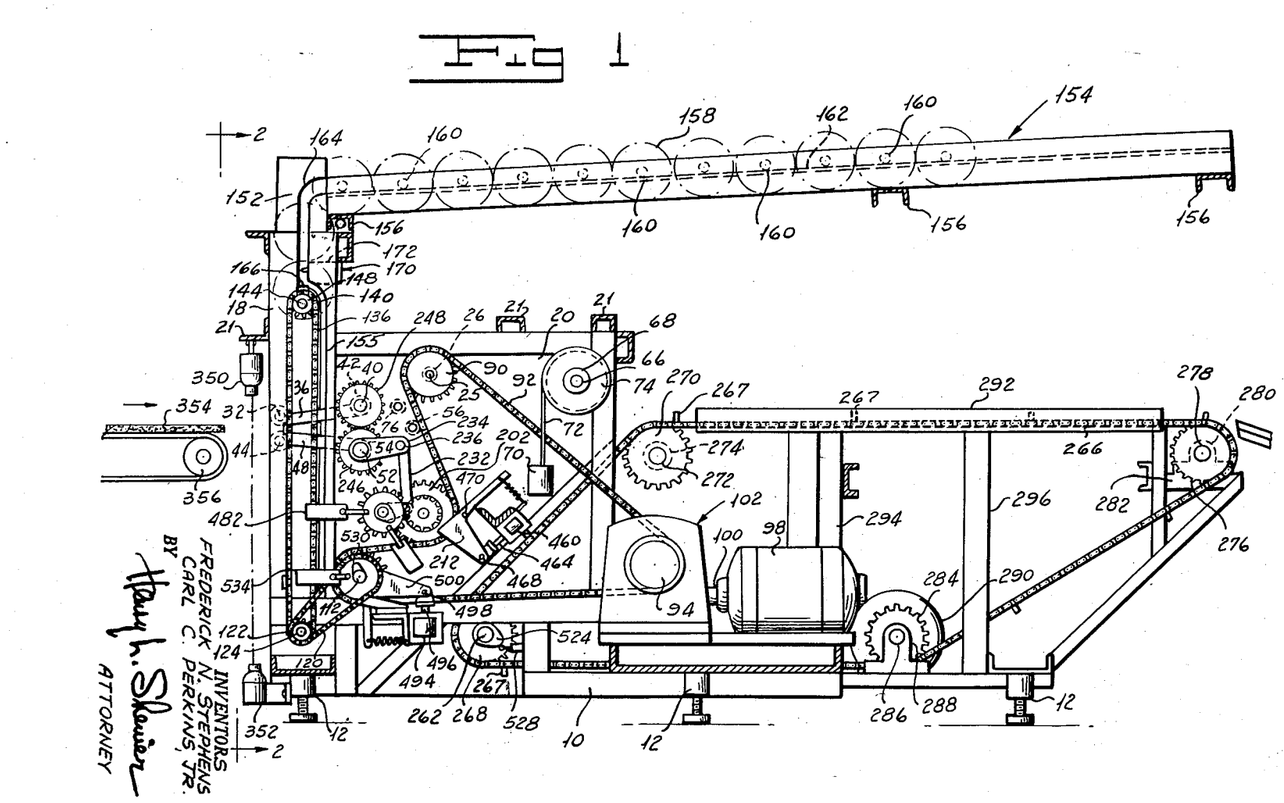
Figure 1 is a side elevation of our mat winding machine with a part removed.
Figure 2:
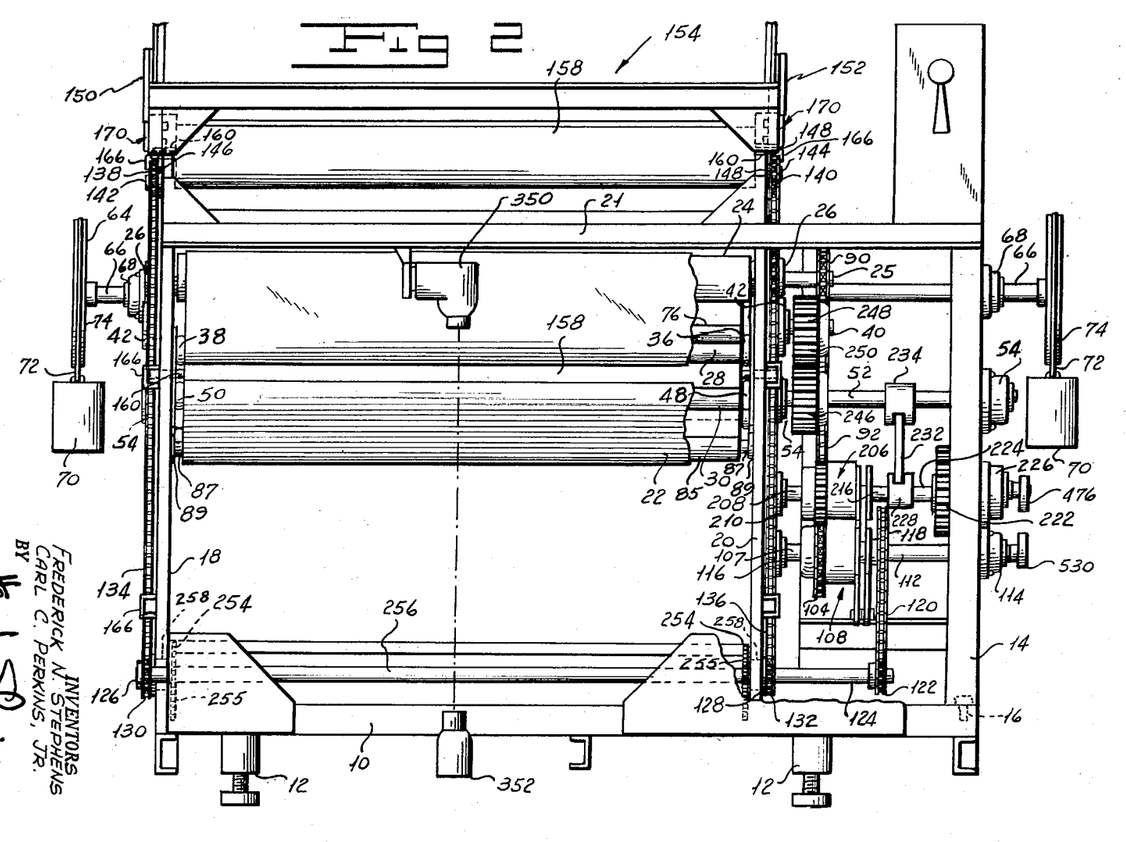
Figure 2 is a front elevation of our mat winding machine viewed along the line 2—2 of Figure 1.

Referring now more particularly to Figures 1 and 2 of the drawings, our mat winding machine includes a a frame having a generally rectangular base portion 10 carried on a number of individually adjustable supports 12. The frame is formed with a side portion 14 fixed to the base by any suitable means such as bolts 16 or the like. Base 10 also supports a pair of spaced side members 18 and 20 fixed thereto by any appropriate means such as welding or the like. If desired, channel irons 21 may be welded to the respective members 14, 18, and 20 at the upper ends thereof, as viewed in Figure 2, to complete a rigid supporting framework.

Figure 3:
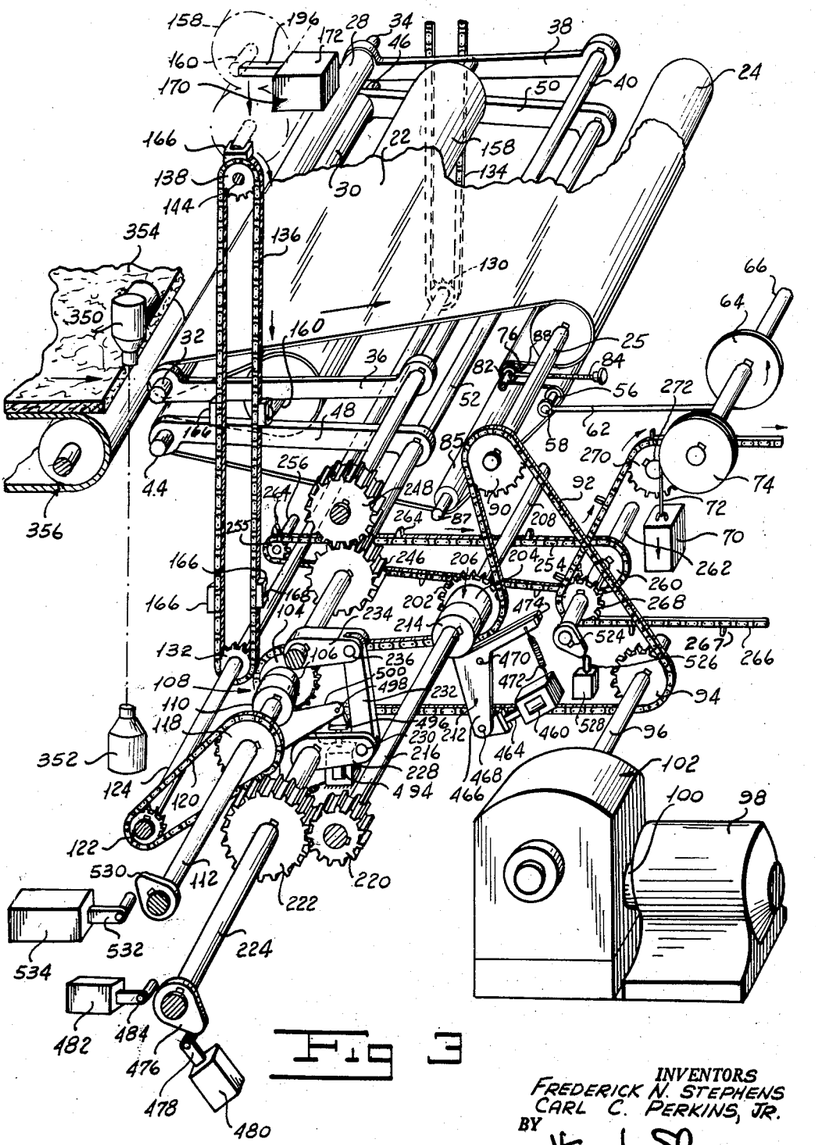
Figure 3 is a fragmentary diagrammatic perspective view of our mat winding machine with parts removed showing the arrangement of the drive mechanism.

As can be seen by reference to Figures 1 to 3, the winding assembly of our machine includes an endless belt 22. Belt 22 is carried by a plurality of rolls including drive roll 24, the shaft 25 of which is rotatably mounted in bearings 26 carried in the respective side members 18 and 20. The plurality of rolls includes a pair of movable rolls 28 and 30. Roll 28 is rotatably carried by its journals 32 and 34 on respective arms 36 and 38 fixed on a shaft 40 for rotation therewith. Shaft 40 is rotatably mounted in bearings 42 in each of the members 18 and 20. The second movable roll 30 is rotatably mounted by its journals 44 and 46 on respective arms 48 and 50 fixed on a shaft 52 carried by bearings 54 in the respective members 14, 18 and 20.

Figure 4:
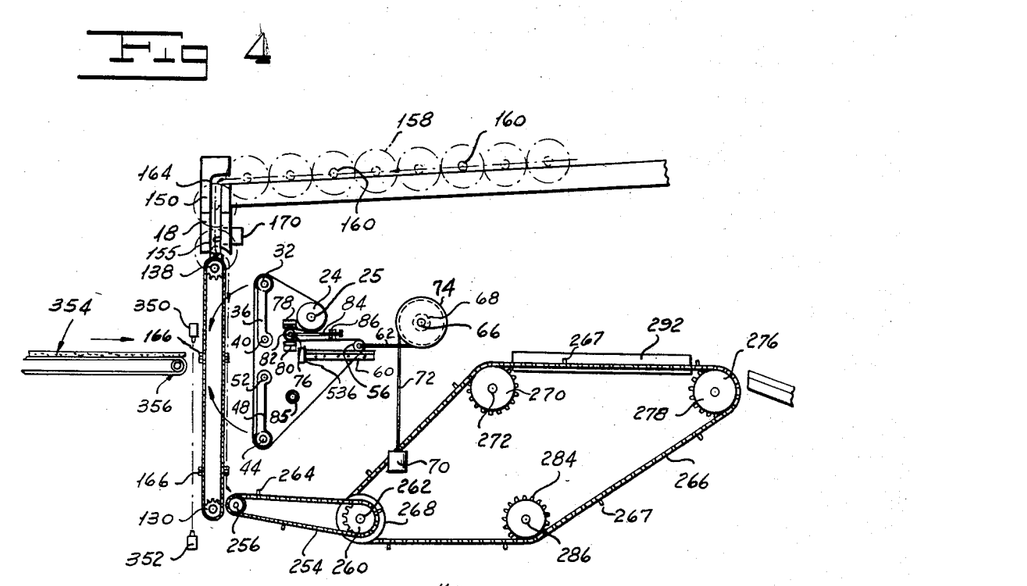
Figure 4 is a schematic view of our mat winding machine on a reduced scale showing the relative position of the parts before the movable belt-carrying arms have been closed.
Figure 5:
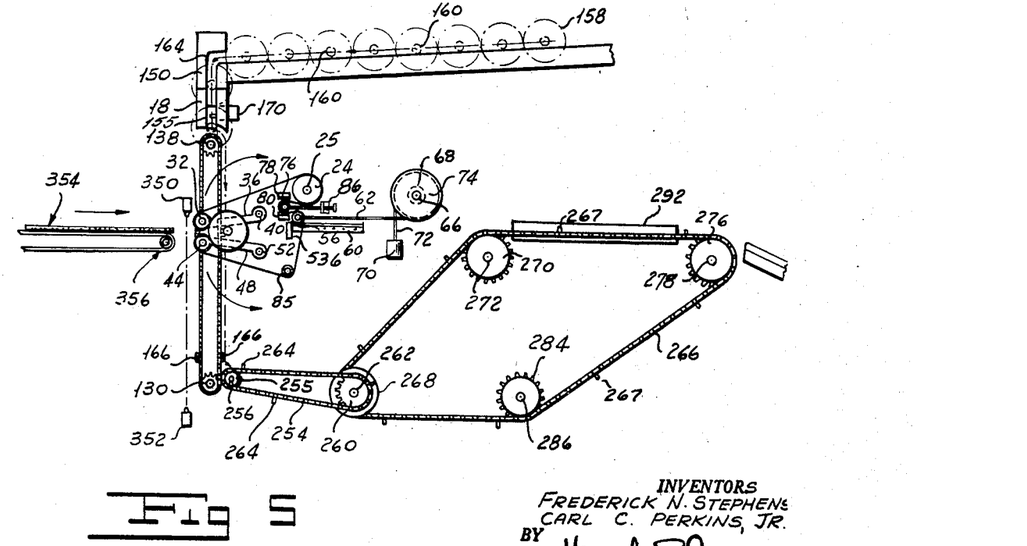
Figure 5 is a schematic view of our mat winding machine similar to Figure 4 showing the relative position of parts during the winding operation.

Referring now to Figures 3, 4 and 5, in order to tension belt 22 we provide a roll 56 carried by its journals 58 on respective brackets 60 secured to the members 18 and 20 by means such as rivets or the like. Roll 56 slides back and forth along the brackets 60 depending upon the position of the movable rollers 28 and 30. A pair of flexible members 62 each fixed between one of the journals 58 and a pulley 64 fixed on a shaft 66 rotatably supported between side members 18 and 14 by bearings 68 provide means by which force may be exerted on roll 56 to tension belt 22. A pair of weights 70 suspended by cables 72 from pulleys 74 fixed on the respective ends of shaft 66 for rotation therewith bias shaft 66 to tension cables 62. In order to provide a means for adjusting the effective length of belt 22, we slidably mount a roll 76 between side members 18 and 20 by means of respective pairs of brackets 78 and 80 between which the roll journals 82 ride. Brackets 78 and 80 are fixed to the sides by means such as rivets. A pair of lead screws 84 carried by a pair of brackets 86 welded to the respective sides 18 and 20 engage blocks 88 carried by respective journals 82. It will be appreciated that lead screws 84 may be turned in one direction or the other to move roll 76 to adjust the effective length of belt 22. An idler roll 85 carried by its journals 87 in bearings 89 in the respective sides 18 and 20 completes the belt-carrying assembly.

Referring again to Figure 3, belt drive shaft 25 carries a sprocket 90 on one end thereof for rotation therewith. Sprocket 90 is driven by a pitch chain 92 which is driven by a sprocket 94 carried by the main drive shaft 96 of the machine. The shaft 100 of the main drive motor 98 drives a gear assembly, indicated generally by the reference character 102. Gear assembly 102, in turn, drives the shaft 96. Chain 92 also provides a means for driving a sprocket 104 fixed on the driving member 106 of a one-revolution clutch, indicated generally by the reference character 108. Driving member 106 is fixed on a shaft 107 rotatably mounted in a bearing 116 carried by member 20. This clutch may be of any type well known to the art as, for example, the single revolution clutch shown and described in United States Patent 2,140,737, dated December 20, 1938. Clutch 108 includes a driven member 110 fixed on an inlet conveyor drive shaft 112. As can be seen by reference to Figure 2, shaft 112 is supported in a bearing 114 carried on the side 14. A sprocket 118 fixed on shaft 112 drives a chain 120 to drive a sprocket 122 fixed on a shaft 124 carried by respective bearings 126 and 128 in the frame side members 18 and 20. When clutch 108 is engaged to drive shaft 112, shaft 124 rotates. A pair of sprockets 130 and 132 fixed on shaft 124 adjacent the respective sides 18 and 20 drive a pair of mandrel conveyor chains 134 and 136. The respective chains 134 and 136 ride around idler sprockets 138 and 140 carried by stub shafts 142 and 144 mounted in bearings 146 and 148 adjacent the upper ends of a pair of upwardly extending mandrel guide plates 150 and 152 fixed at the forward ends of members 18 and 20 by any appropriate means such as bolts, rivets, or the like.

As can be seen by reference to Figures 1 and 2, we form a mandrel supply rack, indicated generally by the reference character 154, over the top of the machine. Rack 154 may be carried by means such as channel irons 156 supported by any suitable means (not shown) from the machine frame. Rack 154 is adapted to support a plurality of mandrels 158, each of which has a pair of journals 160. The rack 154 is inclined downwardly toward the front of the machine as viewed in Figure 1. Guide flanges 162 guide journals 160 into guide slots 164 formed in the respective plates 150 and 152. It will be appreciated that the mandrels 158 roll down the rack 154 so that their journals engage in guide slots 164 and ride downwardly toward conveyor chains 134 and 136. Each of the members 18 and 20 is formed with a slot 155 through which a mandrel journal 160 extends to engage carrying means on one of the chains 134 or 136. The slots 155 in the respective members 18 and 20 register with slots 164 in plates 150 and 152 to provide a continuous passage for the mandrel journals from the rack 154 to the discharge station of the machine.

Spaced along the length of each of the chains 134 and 136 we mount a number of mandrel carrier blocks 166 formed with recesses 168 adapted to receive a mandrel journal. As can be seen by reference to Figure 3, blocks 166 may receive the journals of a mandrel and carry it to the winding position on the machine when chains 134 and 136 are driven. After the winding operation is completed, the mandrel conveyor chains 134 and 136 may again be stepped to carry the mandrel to a position where it may be removed by a discharge conveyor in a manner to be described in detail hereinafter.

Figure 6:
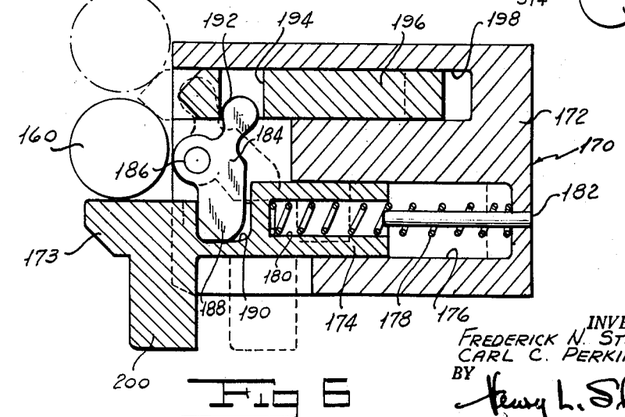
Figure 6 is a sectional view drawn on an enlarged scale of the mandrel feeding latch of our mat winding machine.

In order to provide a means for feeding a mandrel to the blocks 166 of the conveyor chain, we mount a pair of feeding devices, each of which is indicated generally by the reference character 170, adjacent the respective upper portions of the mandrel conveyor chains 134 and 136, as viewed in Figure 2. Referring now to Figure 6, each of the feed devices 170 includes a housing 172 mounted on its associated plate 150 or 152 by any appropriate means. A plunger 174 is mounted for reciprocation within a recess 176 formed in housing 172. A spring 178 bearing between the bottom of a bore 180 formed in plunger 174 and the bottom of recess 176 normally urges plunger 174 to the left as viewed in Figure 6. A guide pin 182 fixed in the base of bore 180 aligns spring 178. A lever 184 pivoted on a pin 186 within housing 172 has one end 188 seated in a recess 190 formed in the top of plunger 174 as viewed in Figure 6. The other end 192 of lever 184 is seated in a transverse bore 194 formed in a stop finger 196 slidably mounted in a recess 198 in housing 172. From the construction thus far described, it can be seen that when spring 178 is permitted to urge plunger 174 to the left as viewed in Figure 6, lever 184 forces finger 196 into its recess 198. When the parts occupy this position, the journals of the mandrel next to be engaged by the mandrel conveyor blocks 166 are supported by the ends 173 of the plungers 174. Each of the plungers 174 is formed with a depending projection 200 adapted to be engaged by one of the blocks 166 next to receive a mandrel journal. This engagement takes place during one step of a mandrel conveyor chain operation. When engaged and moved by a block 166, projection 200 will be forced to the right to the broken line position shown in Figure 6 to permit the mandrel to drop into a position where the journals are supported by the blocks 166. At the same time fingers 196 are moved to the left by lever ends 192 to the broken line position shown in Figure 6. Fingers 196 prevent the next succeeding mandrel from falling down past plunger 174 when the mandrel which has just been dropped onto the conveyor chains is carried away. As the blocks 166 carried by the conveyor chains move the mandrel to the wrapping position, the springs 178 will force the plungers 174 to the left as viewed in Figure 6. This movement retracts the stop fingers 196 and permits the mandrel supported thereby to fall to the full-line position shown in Figure 6 resting upon the projection 173 in position for the next mandrel-dropping operation.

Referring again to Figure 3, it can be seen that the main drive chain 92 also drives a sprocket 202 carried by the driving member 204 of a one-revolution clutch, indicated generally by the reference character 206. Driving member 204 is fixed on a shaft 208 rotatably mounted in a bearing 210 fixed in side member 20. When the release member 212 of the clutch 206 is actuated, driving member 204 drives a driven member 214 fixed on a shaft 216 through one revolution. Shaft 216 is rotatably carried by a bearing (not shown) on the side frame member 14 and has a pinion 220 fixed on its end adjacent the member 14. Pinion 220 drives a gear 222 fixed on a shaft 224 rotatably mounted in a bearing 226 carried by the side frame member 14. The gearing 220, 222 provides a step-down ratio which may conveniently produce a half-revolution of gear 222 for every revolution of gear 220. We fix a crank 228 on the end of shaft 224 remote from bearing 226. Crank 228 is pivotally secured by a pin 230 to a link 232. Link 232 is pivoted on a second crank 234 by a pin 236. Crank 234 is fixed on shaft 52 which carries the pair of arms 48 and 50 supporting the lower movable belt-carrying roll 30. A spur gear 246 fixed on shaft 52 between the side frames 14 and 20 drives a gear 248 fixed on the shaft 40 carrying the arms 36 and 38 associated with the upper movable belt-carrying roll 28. As has been explained hereinbefore, when pinion 220 is driven through one revolution, gear 222 is driven through a half a revolution. The arrangement is such that if the linkage 228, 232, and 234 is in the position shown in Figure 3, one revolution of pinion 220 results in a rotation of shafts 40 and 52 which carries their associated movable roll-carrying arms to the open position as shown in Figure 4. On the next revolution of gear 220 in the same direction, gear 222 drives shaft 224 to rotate shafts 40 and 52 through the connecting linkage to close the rollers. The parts will then be in the position shown in Figures 3 and 5. That is, the arrangement is such that on the initial revolution of pinion 220, the crank 228 passes its bottom dead center position while the upper crank 234 does not. Consequently, on the succeeding revolution of gear 220, crank 228 continues to rotate in the same rotary direction but crank 234 merely returns to its initial position. It will be appreciated that this operation depends on the gear ratio between pinion 220 and gear 222, the relative positions of the centers of shafts 224 and 52, and the relative lengths of the cranks 228 and 234, as well as the length of link 232.

As the machine operates and a new mandrel is presented to the belt 22, the mandrel upon which a mat has just been wound is in a position to be carried away from the machine. In order to accomplish this end I provide a horizontal discharge conveyor disposed adjacent the bottom of the machine. This conveyor includes a pair of chains, each indicated by the reference character 254 and carried by a respective sprocket 255. Sprockets 255 are disposed adjacent the respective sides 18 and 20 and fixed for rotation on an idler shaft 256 supported in bearings 258 in the respective side panels 18 and 20. Chains 254 extend rearwardly of the machine and engage drive sprockets 260. These sprockets 260 are keyed to conveyor drive shaft 262. Shaft 262 may be supported by bearings (not shown) provided in the support side frames 18 and 20. Each of the chains 254 is formed with projections 264 spaced along its length.

When a mandrel which has been wrapped is carried by the conveyor chains 136 and 138 to a position adjacent the bottom of the machine, the discharge conveyor chains 254 are driven in a manner to be described hereinafter to carry the mandrel rearwardly of the machine to a position where it may be carried away from the machine by a second discharge conveyor. This second discharge conveyor includes a pair of chains 266 each of which passes around a sprocket 268 fixed on the shaft 262. As viewed in Figure 3, each of the chains 266 extends upwardly from sprocket 268 and toward an idler sprocket 270 carried by a shaft 272 mounted in bearings 274 carried by the respective side frames 18 and 20. Referring now to Figure 1, the chains 266 each extend horizontally rearwardly from the sprocket 270 to an idler sprocket 276. The sprockets 276 are carried by a shaft 278 rotatably mounted in bearings 280 supported by brackets 282 formed at the rear of the machine. After passing around sprockets 276, the chains 266 pass downwardly to drive sprockets 284 fixed on a shaft 286 supported in bearings 288 carried by the rectangular base of frame 10 of the machine. Shaft 286 is driven by a motor 290 energized by means to be described hereinafter when a wrapped mandrel is to be removed from the wrapping station. The chains 266 are guided in their horizontal travel by angle irons 292 supported by uprights 294 and 296 extending upwardly from the rectangular base of frame 10. It will be appreciated that chains 266 and guides 292 form a table along which the wound mandrels are carried when being discharged from the machine. Chains 266 are provided with carriers 267 spaced along their lengths. Carriers 267 engage the journals of a mandrel to carry the mandrel away from chains 254.

Figure 7:
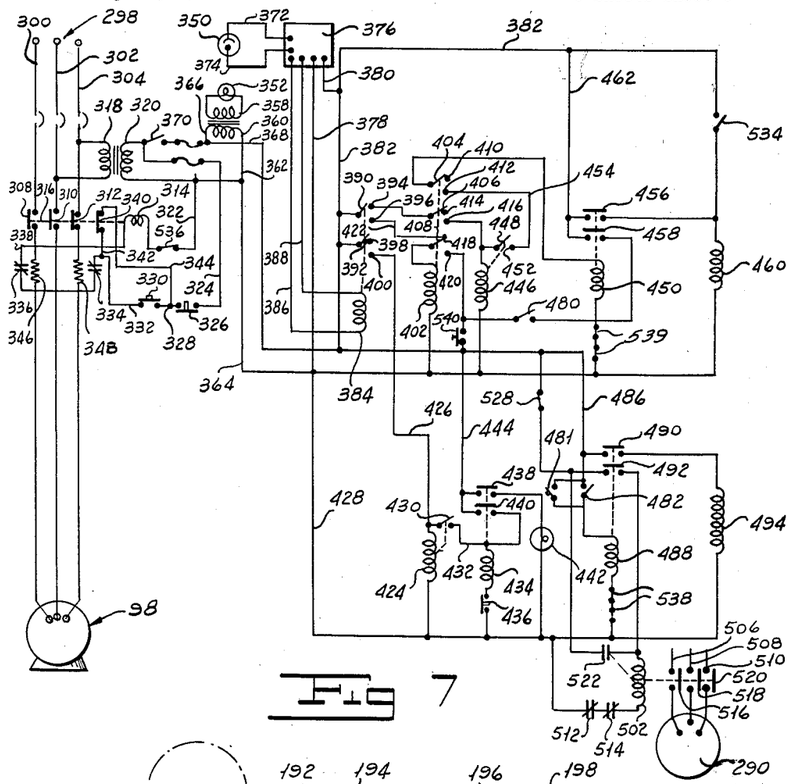
Figure 7 is a schematic view of the electrical circuits employed to control our mat winding machine.

Referring now to Figure 7, we provide an electrical control circuit for controlling the sequence of operations of our winding machine. A suitable three-phase source of electrical energy, indicated generally by the reference character 298, feeds lines 300, 302, and 304. The lines 300, 302, and 304 are connected to the main drive motor of the machine which is indicated generally by reference character 98. In order to provide a means for starting the main drive motor, we dispose respective contactors 308, 310, and 312 in the lines 300, 302, and 304. A starter winding 314 is adapted when energized to close the contactors 308, 310, and 312 through a linkage 316. In order to provide a means for energizing the coil 314, we connect the primary winding 318 of a transformer across the lines 302 and 304. One side of the secondary winding 320 of this transformer is connected by a line 322 to the coil 314. The other side of the secondary winding 320 is connected by a conductor 324 to one contact of a normally closed stop switch 326. Switch 326 is connected by a conductor 328 to a contact of the start switch 330. A conductor 332 connects switch 330 to a pair of series-connected, normally closed contactors 334 and 336. A conductor 338 connects contactor 336 to the winding 314. It will readily be appreciated that when the start switch 330 is operated, the circuit of winding 314 will be complete from lines 302 and 304 through the transformer including primary 318 and secondary 320, from one side of secondary 320 through line 324, through the normally closed stop button 326, through the now closed start switch 330, through conductor 332, through contacts 334 and 336, through conductor 338, through the winding 314, and through conductor 322 back to the other side of secondary winding 320. When coil 314 is so energized, it actuates the linkage 316 to close the respective contacts 308, 310, and 312 to complete the circuit to motor 306. We also provide a holding contactor 340 for maintaining the circuit of coil 314 after the start button 330 has been released and until the stop button 326 is pressed. One contact associated with contactor 340 is connected to conductor 332. A conductor 344 connects the other contact associated with contactor 340 with the conductor 328. It will readily be appreciated that the circuit provided by contactor 340 is in parallel with the start button 330 so that after winding 314 is energized to close contactor 340, the circuit of winding 314 will be maintained through contactor 340 after button 330 has been released. A pair of resistors 346 and 348 disposed in the respective lines 300 and 304 and associated with the respective normally closed contacts 336 and 334 provide thermal overload relays.

In order to provide a means for controlling the operations of our winding machine, we employ a photorelay including a phototube 350 associated with a light source 352. Referring now to Figure 3, the photoelectric relay is energized or de-energized depending upon whether its light source is or is not interrupted by a length of fibrous material 354. A conveyor, indicated generally by reference character 356, feeds the length of material 354 toward a mandrel which is in winding position. The light beam provided by the source 352 passes through the space between conveyor 356 and the opening of the wrapping belt pocket. When the mat 354 enters this space, it cuts off the light to actuate the photo relay. When the length of mat has been wound on a mandrel, the light beam is re-established and the photo relay switches to its light on position. It is to be understood that the speed of the mat feeding conveyor 356 and the spacing of lengths of mat thereon are such that lengths of mat are fed to the machine in proper phase with the machine operation. Conventional control means (not shown) could control the operation of conveyor 356.

Referring again to Figure 7, the light source 352 is energized from the secondary winding 358 of a transformer. One side of the primary winding 360 of his transformer is connected by a conductor 362 to a line 364 connected to the secondary winding 320. The other side of the secondary winding 360 is connected by a conductor 366 to a line 368 which may be connected to the other side of secondary 320 by a manually operated switch 370. It can be seen that when switch 370 is closed, lines 364 and 368 are energized. These lines act as the source of energy for the control circuit to be described. The phototoube 350 is connected by a pair of conductors 372 and 374 to an amplifier 376. Amplifier 376 is energized by a conductor 378 connected to line 364 and by a conductor 380 connected to an auxiliary supply line 382 connected to the line 368. When a length of material 354 cuts off the light beam provided by source 352, a winding 384 connected to amplifier 376 by conductors 386 and 388 is energized to close its associated contactors 390 and 392, each connected to the line 382. Associated with each of the contactors 390 and 392 are respective pairs of contacts 394 and 396 and 398 and 400. When the light beam from source 352 is uninterrupted, each of the contactors 390 and 392 is adapted to engage the upper one of its associated pair of contacts. That is, contactor 390 engages contact 394 and contactor 392 engages contact 398. When the light beam from the source 352 is interrupted, contactors 390 and 392 engage the respective contacts 396 and 400. The engagement of contactor 390 with contact 396 energizes the winding 402 of a latching relay including a bank of contactors 404, 406, and 408. Associated with the contactors 404, 406, and 408 are respective pairs of contacts 410 and 412, 414 and 416, and 418 and 420. The contact 418 associated with contactor 408 is connected to the contact 396 by a conductor 422. Before winding 402 is energized, each of the contactors 404, 406, and 408 is in the position where it engages the upper one of its associated pair of contacts as shown in Figure 7. When the light beam is interrupted so that contactors 390 and 392 engage the lower ones of their pair of contacts, the circuit to winding 402 is complete and contactors 404, 406, and 408 are moved down to engage the lower ones of their associated pairs of contacts. The circuit through winding 402 may be traced from line 364 through winding 402, through contactor 408, through conductor 422, through contactor 390 to line 382 which is connected to line 368. It will be appreciated that this circuit is interrupted as soon as the latching relay coil 402 moves contactor 408 out of engagement with contact 418.

The interruption of the light beam provided by source 352 which operates the photo relay including contactor 390 and 392 also serves to energize an alarm delay relay coil 424. One side of the coil 424 is connected by a conductor 426 to the contact 400. The other side of the coil 424 is connected by a conductor 428 to the line 364. When the light beam is interrupted, the circuit to the alarm delay relay coil 424 is completed from line 364 through conductor 428, through winding 424, through conductor 426, to contact 400, through contactor 392, to line 382 which is connected to line 368. The alarm delay relay including winding 424 is set to operate a predetermined time after the winding 424 has been energized. This time delay is correlated with the length of mat which is to be wound about a mandrel. If the length of mat is too long, winding 424 remains energized a sufficient time to close its associated contactor 430. One of the contacts associated with contactor 430 is connected by a conductor 432 to an alarm relay winding 434. Winding 434 is connected to a contact of a normally closed manually operable reset switch 436. Reset switch 436 is connected to the conductor 428. It will be appreciated that if the length of mat is sufficiently long, the alarm delay relay winding 424 closes its contactor 430 to complete the circuit of the alarm relay winding 434. When the alarm relay winding is thus energized, it closes its associated contactors 438 and 440 to complete the circuit of a signal device such as a lamp or the like 442. When this takes place, the circuit of the alarm device may be completed from line 428 through the lamp 442, through contactor 438, and to the line 368 by a conductor 444. It will also be observed that the contactor 440 maintains the winding 434 energized even after winding 424 becomes de-energized. When the alarm relay is to be reset, button 436 may be pressed to open the circuit of the winding 434 and release the armatures 438 and 440.

When the length of mat has been rolled onto the mandrel a sufficient amount so that its trailing edge clears the light beam, the photo relay will again be actuated so that contactors 390 and 392 again move to positions where they engage the upper ones of their associated pairs of contacts. It will be understood that the relay including contactors 404, 406, and 408 is of the latching type. When the mat thus clears the light beam, the alarm delay relay winding 424 is de-energized and the alarm will not operate. At the same time, the mat delay relay winding 446 is energized to ensure that a sufficient period is provided for the winding to be completed before the rest of the operations take place. Winding 446 is connected between contact 416 and the line 364. When the latching relay including contactor 406 has operated and the photo relay is in the condition where its contactors engage the upper ones of their associated pairs of contacts, the circuit to winding 446 is complete from line 364 through winding 446, through contact 416 and contactor 406 to contact 394, through contactor 390 to the line 382 which is connected to the line 368. A predetermined time after winding 446 is energized it closes its associated contactor 448 to complete the circuit of a roll drive solenoid relay winding 450. Winding 450 is connected between line 364 and the contactor 404. Contact 412 of the pair of contacts associated with contactor 404 is connected by a conductor 454 to the contact 452 associated with contactor 448. After the predetermined time delay, the circuit of winding 450 may be traced from line 364 through winding 450, through contact arm 404 to contact 412, through conductor 454 to contact 452, through contactor 448 to contact 416, through contactor 406 to contact 394, through contactor 390 to line 382 which is connected to line 368. When energized, winding 450 closes its associated contacts 456 and 458 to energize a roll drive solenoid 460. Roll drive solenoid 460 is connected between line 364 and one of the contacts associated with contactor 456. The other of the contacts associated with contactor 456 is connected to line 382 by a conductor 462.

Referring now to Figure 3, the roll drive solenoid 460 includes an armature 464 pivotally connected by a pin 468 to an arm 466 of the actuating member 212 associated with clutch 206. Solenoid 460 may conveniently be mounted on side frame member 14 by any appropriate means such as a bracket or the like. Actuating member 212 is pivotally mounted on a pin 470 carried by the side frames 14 and 20. It will be appreciated that when solenoid 460 is energized, its core pivots member 212 in a direction to release clutch 206 and permit a single revolution of gear 220 to open or close the rolls 28 and 30 depending upon the initial position occupied by the rolls. In order to reset the clutch actuating member 212, we provide a spring 472 connected between an arm 474 of member 212 and the solenoid 460. When the solenoid 460 is de-energized, spring 472 pivots member 212 back into the position where it holds the driven member 214 of clutch 206.

In order to de-energize the roll drive solenoid 460 after rolls 28 and 30 have started to open, we mount a cam 476 on shaft 224 of the roll arm drive. Cam 476 is arranged to actuate the movable member 478 of a microswitch 480 carried on side frame 14. Referring now to Figure 7, it can be seen that switch 480 is normally open. When closed, this switch completes the circuit of winding 402 to unlatch the contactors associated therewith. This circuit to winding 402 is completed from line 382 through conductor 462, through contact 458, through switch 480 to contact 420, through contact arm 408 (which still is latched in the down position) and through winding 402 to line 364. When winding 402 is again so energized, its contactors 404, 406, and 408 change position, moving to the up position where they engage the upper ones of their respective pairs of contacts. When this occurs, the mat delay relay winding 446 is de-energized and the solenoid relay 450 is de-energized. As a consequence of the de-energization of winding 450, contactor 456 opens and the roll drive solenoid circuit is interrupted to permit the roll drive to stop after one revolution.

In order to carry the mandrel which has just been wrapped away from the winding station and to move a new mandrel to the winding position, we provide a microswitch 482 carried by side frame member 14. When the rolls 28 and 30 have nearly reached their full open position, cam 476 engages the movable element 484 of switch 482 to close the switch. As can be seen by reference to Figure 7, one contact of switch 482 is connected to line 368 by a conductor 486. The other contact associated with switch 482 is connected to one side of a mandrel conveyor relay winding 488, the other side of which is connected to line 428. When cam 476 closes switch 482, winding 488 is energized to close its associated contactors 490 and 492. Contactor 490 completes the circuit of a mandrel chain drive solenoid winding 494 connected between line 428 and one of the contacts associated with contactor 490. Referring again to Figure 3, the solenoid including winding 494 has an armature 496 pivotally connected by a pin 498 to the actuating member 500 of the one revolution clutch 108. Actuating member 500 is similar to actuating member 212 of clutch 206 and may automatically be reset in the same manner. When solenoid winding 494 is energized, it operates member 500 to release the driven member 110 of clutch 108 to permit the rotation of shaft 112. Shaft 112 drives mandrel chains 136 and 134 to advance a new mandrel to the winding station and to position the mandrel upon which a mat has just been wound to be picked up by the discharge conveyors.

The contactor 492 associated with winding 488 completes the circuit of the starting coil 502 of the discharge conveyor motor 290. Motor 290 may be supplied with electrical energy from three lines 506, 508, and 510 connected to an appropriate three-phase source. The circuit to winding 502 may be traced from line 428 through a pair of normally closed overload contactors 512 and 514 through winding 502, through contactor 492 to line 368. When energized, winding 502 closes respective contactors 516, 518, and 520 disposed in the lines 506, 508, and 510. In order to maintain the circuit of winding 502 complete after switch 482 opens to de-energize winding 488, we connect normally open holding contacts 522 in parallel with contactor 492. Energization of winding 502 closes switch 522 to maintain the motor circuit after contactor 492 opens.

Referring now to Figure 3, when the conveyor chains 266 are driven by motor 290, they will rotate the sprocket wheel 268 keyed to shaft 262. Sprocket 260 is likewise keyed to shaft 262 and will thus drive the conveyor chain 254. During each revolution of the shaft 262, it will rotate a cam 524 so that the switch arm 526 will be engaged once each revolution. This switch arm, which may be operated from lugs (not shown) carried on conveyor chain 266, will operate switch 528. Turning again to Figure 7, switch 528 is disposed in the line energizing both a contact associated with contactor 492 and the holding switch 522 through the line 368. It will be appreciated that when the normally closed switch 528 is actuated by the cam 524, the circuit to the conveyor motor 504 opens and the discharge conveyors stop.

Referring again to Figure 3, when the mandrel being fed to winding position and the mandrel which has just been wrapped reach their new positions, a cam 530 carried by shaft 112 engages the movable member 532 of a normally open switch 534. Referring again to Figure 7, switch 534 is connected between the roll drive solenoid winding 460 and the line 382 in parallel with the contacts associated with contactor 456. When this normally open switch 534 is closed by cam 530, the roll drive solenoid 460 is energized to permit one revolution of the driven member 214 of clutch 206. As has been explained hereinbefore, on this revolution of shaft 216 the rolls 28 and 30 are moved from the open position to the closed position to wrap belt 22 around the newly positioned mandrel.

In the event a mandrel is overwound with mat, the belt would be extended and the take up roll 56 would be moved to a position to actuate an overwrap microswitch 536. This can be seen by reference to Figure 4. As can be seen by reference to Figure 7, overwrap switch 536 is connected between the secondary 320 and winding 314. When this normally closed switch, which may be actuated in response to movement of sheave 74 by means not shown, is opened on the occasion of an overwrap, winding 314 is deenergized to open the line contacts and stop the main drive motor 98.

In the event a mandrel end is not in position at the end of a wrapping operation we provide means for ensuring that the inlet conveyor chains 134 and 136 will not be stepped and for preventing the energization of the discharge conveyor drive motor. If a mandrel end is not properly positioned at the end of a wrapping operation, one of a number of microswitches 538, connected in series between winding 488 and line 428, will be open and winding 488 cannot be energized by the closing of switch 482 and the inlet conveyor chains 134 and 136 will not be stepped and the discharge conveyor will not be driven. A control reset switch 540 connected between line 368 and contact 420 provides a means for resetting the circuit.

In order to prevent initiation of a wrapping operation when an end of a mandrel just picked up by the inlet conveyor drive chains 134 and 136 is not properly positioned in its carrier 166, we provide a pair of limit switches adjacent the points at which the respective mandrel ends are fed to carriers 166. These switches 539 are connected in series with roll drive solenoid relay winding 450 as can be seen by reference to Figure 7. If an end of a mandrel just picked up is not properly positioned, a switch 539 will be open and winding 450 cannot be energized to energize winding 460. A winding operation will not, therefore, be commenced until the defect is remedied.

In operation, when our mat winding machine is to be employed to wrap lengths of a mat or bat of fibrous material about mandrels to form tubes or ducts of insulating material, a supply of mandrels is disposed on the inclined mandrel rack 154. Assuming a condition in which a mandrel is in a position where it is about to be wrapped with a length of material as shown in Figure 5, as the length interrupts the light beam from source 352 to the photocell 350, the photo relay winding 384 operates to move its associated contactors 390 and 392 to the down position as viewed in Figure 7. When this occurs, the circuit of the latching relay winding 402 is energized momentarily to move its contact arms 404, 406, and 408 to the down position as viewed in Figure 7. At the same time, contacting arm 392 completes the circuit of the alarm delay relay winding 424 in the manner described hereinbefore. If the mat is of the proper length, this circuit will be interrupted by the next operation of the photo relay when the trailing edge of the length of mat clears the light beam before winding 424 closes its contactor 430. If, however, the mat is of excessive length, winding 424 will be energized a sufficient time between the interruption and re-establishment of the light beam to close contactor 430. When this occurs, winding 434 is energized to close its contactor 438 to complete the circuit of the alarm device 442. Button 436 must then be actuated to de-energize the alarm relay winding 434.

Assuming the mat is of the proper length, the latching relay including contactors 404, 406, and 408 is energized to move them to the down position as viewed in Figure 7. When this occurs, arm 406 completes the circuit of the mat delay relay which, after a time sufficient to complete the winding of the length of mat, closes its contactor 448 to complete the circuit of the roll drive relay winding 450 through the latching contactor 404. Energization of winding 450 closes contactors 456 and 458 to energize the roll drive solenoid 460.

When roll drive solenoid 460 is thus energized, it operates the actuating member 212 of the one-revolution clutch 206 to permit a single revolution of shaft 216 carrying pinion 220. Pinion 220 drives gear 222 to move rolls 28 and 30 to the open position through the linkage including crank 238, link 232, and crank 234.

As the arms begin to open, cam 476 on shaft 224 operates switch 480 to complete the circuit of winding 402 and operate contact arms 404, 406, and 408 to their up or open position as viewed in Figure 7. This operation de-energizes mat delay relay winding 446 and roll drive relay winding 450. The de-energization of winding 450 opens the circuit to roll drive solenoid 460 to permit actuating member 212 to move back to a position where it may stop the driven member 214 of clutch 206 after one revolution thereof.

When rolls 28 and 30 have nearly reached their full open position, cam 476 closes normally open switch 482 to energize the conveyor relay winding 488. This energization closes a first contactor 490 to complete the circuit of a chain drive solenoid 494. The energization of winding 494 operates the actuating member 500 of one revolution clutch 108 to permit a single revolution of shaft 112. Shaft 112 drives the mandrel conveyor chains 136 and 134 through one step to position a new mandrel for winding, to deliver the mandrel just wound to the discharge conveyor, and to pick up a new mandrel.

The energization of winding 488 also closes contactor 492 to energize the starting relay winding 502 associated with the discharge conveyor motor 290. It will be noted that this operation may be performed manually, if desired, by closing normally open switch 481. Energization of winding 502 closes the motor line contacts and the discharge conveyor motor rotates. The horizontal conveyor chains driven by motor 290 pick up the mandrel which has just been wound from the chains 136 and 134 and move it to a position where it may be picked up by the discharge conveyor including chains 266.

When the mandrel which has just been wrapped has been moved rearwardly of the machine through a predetermined distance, a cam 524 on shaft 262 actuates limit switch 528 to open the circuit to the conveyor motor relay winding 502 and thus open the circuit to motor 290. The discharge conveyors then stop until the next succeeding operation.

When the mandrel intake conveyor chains 136 and 134 have been driven to a position where a new mandrel is positioned for winding, cam 530 on shaft 112 momentarily closes normally open switch 534 to re-energize solenoid winding 460 and again operate actuating member 212 associated with the one-revolution clutch 206 to permit a single revolution of shaft 216. On this revolution of shaft 216 rolls 28 and 30 are moved to their closed position to wrap belt 22 around the newly positioned mandrel, which it will be observed remains on its mandrel carrier blocks 166.

The parts are now in position for a new wrapping operation and the control circuit is conditioned to operate again in the manner described as the new length of mat interrupts the beam of light from source 352 to phototube 350. As has been explained hereinbefore, in the event an overwrap occurs for any reason, switch 536 opens to de-energize the main motor 98. If the mandrel ends are not properly positioned, one of the switches 538 opens to de-energize the discharge conveyor drive motor circuit.

While we have described our machine as including only a single section having one belt 22, it will readily be appreciated that our machine may be formed with a plurality of sections, each having its own belt. All sections may be driven from a single drive and controlled by one control circuit to form a number of sections of tube simultaneously.

It will be seen that we have accomplished the objects of our invention. We have provided a mat winding machine for winding a mat or bat of fibrous material upon a mandrel to form a tube, duct, or the like, in a rapid and automatic manner. The successive operations from the supplying of mandrels to the machine to the removing of mandrels bearing the wrapped green tube are completely automatic. Since there is no need for manually feeding mandrels to our machine and an attendant need not constantly be at hand, the rate of production is increased and the cost of production is substantially reduced. Our machine is, moreover, adapted to be formed in sections so that a number of sections of insulating tube may be formed simultaneously employing a common drive for the wrapping means under the supervision of a common automatic control means.

In the operation of our machine, a mandrel is taken from the rack and automatically moved to the wrapping station by the mandrel conveyor. This motion of the mandrel conveyor actuates a roll drive by the release of a one-revolution clutch. A pair of rolls carried by a pair of roll arms position the wrapping belt around the mandrel. A mat from the mat conveyor 356 is then fed to the space between the roll arms and thus to the bite or nip between the belt and the mandrel. It is to be understood, of course, that the speed of the mat feeding conveyor and the positioning of the mats upon the conveyor are such as to be in proper phase with the speed of operation of our machine. This can be very simply and readily accomplished by varying the speed of the mat feeding conveyor motor by conventional means (not shown) or properly spacing the mats apart upon the conveyor. The leading edge of the mat interrupts the light from the light source upon the photoelectric cell to condition the roll arm actuating circuit. As the trailing edge of the mat again permits the re-energization of the photoelectric cell, the preconditioned circuit operates to open the roll arms after a predetermined time delay. If the preconditioned circuit is not opened within the time delay provided, a time delay alarm will operate to indicate that the mat just wound was too long thus producing an insulating tube of a thickness greater than desired. If the mat is so long as to produce an overwrap which is apt to place an undue strain on the equipment or disrupt its function, an overwrap relay will stop the machine automatically. When the roll arms spread to their fully open position, a switch is closed which initiates two actions. First, the mandrel chain is driven by the release of a one-revolution solenoid to carry the mandrel upon which a mat has just been wound to the discharge station of the machine. At the same time, the discharge conveyor motor is switched into operation to carry a mandrel upon which a mat has been wrapped in a prior operation resting at the discharge station away from the machine. This motion of the mandrel-carrying chain carries a fresh mandrel to the wrapping station while it is carrying the mandrel just wrapped to the discharge station. When the discharge conveyor moves a predetermined amount, a cam driven by the discharge conveyor stops the discharge conveyor motor. In the meantime, the motion of the mandrel feed chain drive reinitiates the cycle of operation.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. In a winding machine for winding respective lengths of a mat of fibrous material successively around mandrels during a number of winding operations, wrapping means for winding a length of mat about a mandrel, a rack for holding a supply of mandrels about which lengths of mat are to be wrapped, each of said mandrels being formed with a pair of journals, a conveyor for moving the mandrels of said supply successively from the rack to a position adjacent the winding means and including a pair of feeding devices disposed between said rack and said inlet conveyor, each of said devices comprising a housing, a plunger slidably mounted in said housing, means for urging said plunger in a direction to support a journal of the mandrel next to be fed to said inlet conveyor, means on said inlet conveyor for moving said plunger to a position where the mandrel supported thereby is permitted to drop onto said conveyor and a finger operated by said plunger to prevent a following mandrel from dropping onto said conveyor.

2. A winding machine for wrapping lengths of mat about mandrels during successive respective winding operations including in combination a plurality of rolls, an endless belt carried by said rolls, respective movable means for supporting the respective rolls of a pair of said rolls for movement toward and away from each other, means for rotating one of said plurality of rolls to drive said belt, means for moving said movable means concomitantly to drive the rolls of said pair alternately to position said pair of rolls to form a pocket of the belt extending around the major portion of the periphery of a mandrel being wrapped at the beginning of a winding operation and to position said rolls to open the pocket at the end of a winding operation, means for rotatably supporting the mandrel being wrapped in a fixed position within said pocket during the winding operation, and means for controlling the operation of said means for rotating one of the rolls and for controlling the operation of said means for moving the movable means.

3. A winding machine for winding respective lengths of a mat of fibrous material successively around mandrels during a number of winding operations including in combination a plurality of rolls, an endless belt carried by said rolls, movable means for mounting a pair of said rolls for movement toward and away from one another, means for rotating one of said plurality of rolls to drive said belt, first drive means for said mounting means, said first drive means being operable during a winding operation alternately to position said pair of rolls to form a pocket of the belt extending around a major portion of the periphery of a mandrel and to open said pocket, a rack for holding a supply of mandrels about which lengths of mat are to be wrapped, a conveyor for moving the mandrels successively from said rack to a position adjacent the belt when the pocket is open, means on said conveyor for supporting a mandrel in a fixed position during a winding operation, second drive means for said conveyor and control means for said first and second drive means, said control means actuating said first drive means to position a mandrel adjacent said belt when said pocket is open and to carry a previously wrapped mandrel away at the end of a winding operation, said control means actuating said second drive means to move said pair of rolls toward each other to form said pocket at the beginning of a winding operation and to move said pair of rolls away from each other at the end of a winding operation to open said pocket.

4. A winding machine as in claim 3 including a discharge conveyor for carrying away a wrapped mandrel at the end of a winding operation.

5. A winding machine as in claim 3 including means for adjusting the tension on said belt.

6. A winding machine as in claim 3 including a pair of feeding devices for feeding mandrels from said rack to said inlet conveyor.

7. A winding machine for winding respective lengths of mat about mandrels during successive winding operations including in combination a frame, a plurality of rolls carried by the frame, an endless belt carried by said rolls, means for carrying a pair of said rolls for movement toward and away from each other, a drive for said roll carrying means, a rack for holding a supply of mandrels about which lengths of mat are to be wrapped, an inlet conveyor for carrying the mandrels of said supply of mandrels successively from said rack to a position adjacent said belt, means on said inlet conveyor for supporting a mandrel in a fixed position during a winding operation, an inlet conveyor drive, a discharge conveyor for carrying a mandrel which has been wrapped away from said inlet conveyor, a discharge conveyor drive and means for rotating one of said rolls to drive said belt.

8. A winding machine as in claim 7 including actuating means for said roll carrying means drive and control means for energizing said actuating means at the end of a winding operation.

9. A winding machine as in claim 7 including actuating means for said roll carrying means drive control means for energizing said actuating means at the end of a winding cycle and means responsive to a predetermined movement of said roll carrying means drive to de-energize said actuating means.

10. A winding machine as in claim 7 including actuating means for said inlet conveyor drive and means responsive to a predetermined movement of said roll carrying means drive to energize said inlet conveyor drive actuating means and to start said discharge conveyor drive.

11. A winding machine as in claim 7 including actuating means for said roll carrying means drive, control means for energizing said actuating means at the end of a winding cycle, means responsive to a predetermined movement of said roll carrying means drive to de-energize said actuating means and means responsive to a predetermined movement of said inlet conveyor drive for re-energizing said actuating means.

12. A winding machine as in claim 7 including means responsive to a predetermined movement of said roll carrying means drive means for starting said discharge conveyor drive, and means responsive to a predetermined movement of said discharge conveyor for stopping said discharge conveyor drive.

13. A winding machine as in claim 7 including first actuating means for said roll carrying means drive, control means for energizing said first actuating means at the end of a winding cycle, means responsive to a first predetermined movement of said roll carrying means drive for de-energizing said first actuating means, a second actuating means for said inlet conveyor drive, means responsive to a second predetermined movement of the roll carrying means drive for energizing the second actuating means and means responsive to a predetermined movement of the inlet conveyor drive to re-energize the roll carrying means actuating means.

14. In a mat winding machine for wrapping successive lengths of mat about successive mandrels, a linear conveyor, a mandrel supply station adjacent one end of said conveyor, a mandrel removal station adjacent the other end of said conveyor, a mandrel wrapping station positioned intermediate said mandrel supply station and said mandrel removal station, means on said conveyor for supporting a mandrel in a fixed position during a winding operation, means for driving said conveyor to move a mandrel along a substantially straight line from said supply station through said wrapping station to said removal station, and a control for said drive for successively stepping said mandrel support means from said supply station to said wrapping station to said removal station.

15. In a mat winding machine for wrapping lengths of mat about mandrels during successive respective winding operations, a linear mandrel inlet conveyor, a mandrel supply station adjacent one end of said conveyor, a mandrel removal station adjacent the other end of said conveyor, a mandrel wrapping station positioned along the length of said conveyor intermediate said mandrel supply station and said mandrel removal station, means on said conveyor for supporting a mandrel in a fixed position during a winding operation, a mandrel inlet conveyor drive for successively stepping said mandrel support means to move a mandrel along a substantially straight line from said supply station to said wrapping station to said removal station, a mandrel discharge conveyor, means for driving said mandrel discharge conveyor to remove a mandrel from the mandrel inlet conveyor at the removal station, and means for controlling the operation of said mandrel inlet conveyor drive means and said mandrel discharge conveyor drive means.

16. A winding machine for wrapping lengths of mat about mandrels during successive respective winding operations including in combination a frame, a linear inlet conveyor supported by said frame, means on said inlet conveyor for supporting a mandrel in a fixed position during a winding operation, a mandrel rack for holding a supply of mandrels about which lengths of a mat of fibrous material are to be wrapped, means mounting said mandrel rack on said frame adjacent one end of said inlet conveyor, wrapping means adapted when operated to wrap a length of mat about one of said mandrels, means mounting said wrapping means at a position on said frame intermediate the length of said inlet conveyor between said rack and the other end of said conveyor, drive means for said wrapping means, drive means for driving said inlet conveyor to carry mandrels from said mandrel rack to said wrapping means, and control means for controlling the operation of said wrapping means drive means and said inlet conveyor drive means.

17. A winding machine as in claim 16 including a discharge conveyor and drive means for said discharge conveyor, said inlet conveyor adapted when operated to carry a mandrel which has been wrapped from said wrapping means to said discharge conveyor, said control means controlling the operation of said discharge conveyor drive means.

18. A winding machine as in claim 16 wherein each of said mandrels is formed with a pair of journals, means carried by said inlet conveyor for engaging said journals to carry a mandrel as the conveyor moves and feeding means disposed between said rack and said inlet conveyor for feeding said mandrels to said inlet conveyor.

19. A winding machine as in claim 16 wherein each of said mandrels is formed with a pair of journals, said inlet conveyor including a pair of pitch chains and means carried by said pitch chains for engaging the journals of a mandrel to carry it along with said chains.

20. A winding machine as in claim 16 including a conveyor for feeding lengths of mat to said wrapping means, said control means comprising a photoelectric relay having a phototube, a source of light providing a light beam for energizing said phototube, said phototube and said light source being carried by said frame on opposite sides of said feeding conveyor whereby said light beam is interrupted by a length of mat to actuate said photoelectric relay and means actuated by said relay for controlling the operation of said inlet conveyor drive means and said wrapping means drive means.

21. A winding machine for wrapping lengths of mat about mandrels formed with journals during successive respective winding operations including in combination a frame, a linear inlet conveyor supported by said frame, a mandrel rack for holding a supply of mandrels about which lengths of mat of fibrous material are to be wrapped, means mounting said mandrel rack on said frame adjacent one end of said inlet conveyor, wrapping means adapted when operated to wrap a length of mat about one of said mandrels, means mounting said wrapping means at a position on said frame intermediate the length of said inlet conveyor between said rack and the other end of said conveyor, drive means for said wrapping means, drive means for driving said inlet conveyor to carry mandrels from said mandrel rack to said wrapping means, control means for controlling the operation of said wrapping means drive means and said inlet conveyor drive means, a feeding means housing mounted on said frame between said rack and said inlet conveyor, a plunger mounted for sliding movement within said housing, resilient means urging said plunger to a position where it supports said mandrel journal of the mandrel next to be carried to said wrapping means, means on said inlet conveyor for moving said plunger to a position to permit said mandrel to drop to said inlet conveyor and means operated by said plunger for preventing the mandrel following said mandrel next to be carried to wrapping position from falling to said conveyor.

22. A winding machine for wrapping lengths of mat about mandrels during successive respective winding operations including in combination a frame, a linear inlet conveyor supported by said frame, a mandrel rack for holding a supply of mandrels about which lengths of a mat of fibrous material are to be wrapped, means mounting said mandrel rack on said frame adjacent one end of said inlet conveyor, wrapping means adapted when operated to wrap a length of mat about one of said mandrels, means mounting said wrapping means at a position on said frame intermediate the length of said inlet conveyor between said rack and the other end of said conveyor, drive means for said wrapping means, drive means for driving said inlet conveyor to carry mandrels from said mandrel rack to said wrapping means, and control means for controlling the operation of said wrapping means drive means and said inlet conveyor drive means, said inlet conveyor including an inlet conveyor drive shaft, a one-revolution clutch comprising a driving member and a driven member, means for mounting said driven member on said inlet conveyor drive shaft, a prime mover, means operated by said prime mover for driving said driving member, and means operated by said control means for actuating said one-revolution clutch.

23. A winding machine for wrapping lengths of mat about mandrels during successive respective winding operations including in combination a frame, a linear inlet conveyor supported by said frame, a mandrel rack for holding a supply of mandrels about which lengths of a mat of fibrous material are to be wrapped, means mounting said mandrel rack on said frame adjacent one end of said inlet conveyor, wrapping means adapted when operated to wrap a length of mat about one of said mandrels, means mounting said wrapping means at a position on said frame intermediate the length of said inlet conveyor between said rack and the other end of said conveyor, drive means for said wrapping means, drive means for driving said inlet conveyor to carry mandrels from said mandrel rack to said wrapping means, and control means for controlling the operation of said wrapping means drive means and said inlet conveyor drive means, said wrapping means including a plurality of rolls, and endless belt carried by said rolls, respective pairs of arms each carrying one of said rolls, means for moving said pairs of arms successively to an open and a closed position, said wrapping means drive means including a prime mover, means operated by said prime mover for rotating one of said rolls to drive said belt, a roll arm drive shaft, a linkage connecting said roll arm drive shaft to the means for moving said pairs of arms, a one-revolution clutch including a driven member and a driving member, means connecting said driving member to the means for rotating one of said rolls whereby said driving member is driven, means driven by said driven member for driving said roll arm drive shaft, and means operated by said control means for actuating said clutch.

References Cited in the file of this patent

UNITED STATES PATENTS

| | | |
|---|---|---|
| 1,810,690 | Trinks et al. | June 16, 1931 |
| 1,912,892 | Eitzen | June 6, 1933 |
| 2,032,076 | Weinbrenner | Feb. 25, 1936 |
| 2,037,348 | Stein | Apr. 14, 1936 |
| 2,385,692 | Corbin et al. | Sept. 25, 1945 |